(12) United States Patent
Fuchs et al.

(10) Patent No.: US 8,066,877 B2
(45) Date of Patent: Nov. 29, 2011

(54) APPARATUS FOR MAGNETIC FIELD AND MAGNETIC GRADIENT ENHANCED FILTRATION

(75) Inventors: Benjamin Fuchs, Wilmington, DE (US); Christian Hoffman, Newark, DE (US); Karsten Keller, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 1032 days.

(21) Appl. No.: 11/353,659

(22) Filed: Feb. 14, 2006

(65) Prior Publication Data

US 2006/0191834 A1   Aug. 31, 2006

Related U.S. Application Data

(60) Provisional application No. 60/653,702, filed on Feb. 17, 2005.

(51) Int. Cl.
 *B01D 35/06* (2006.01)
 *B01D 29/00* (2006.01)

(52) U.S. Cl. ..... 210/223; 210/222; 210/295; 210/323.2; 210/416.1; 210/513; 204/664

(58) Field of Classification Search ........... 210/222, 210/223, 295, 323.1, 323.2, 416.1, 513; 204/664
See application file for complete search history.

(56) References Cited

U.S. PATENT DOCUMENTS

| | | | |
|---|---|---|---|
| 1,527,069 A | 2/1925 | Peck | |
| 1,527,070 A | 2/1925 | Peck | |
| 2,648,636 A | 8/1953 | Ellis | |
| 3,195,728 A | 7/1965 | Sommermeyer | |
| 3,534,902 A | 10/1970 | Gilreath | |
| 3,696,932 A | 10/1972 | Rosenberg | |
| 3,902,994 A | 9/1975 | Maxwell | |
| 4,017,385 A | 4/1977 | Morton | |
| 4,144,163 A | 3/1979 | Kolm | |
| 4,166,788 A | 9/1979 | Druz | |
| 4,238,326 A | 12/1980 | Wolf | |
| 4,279,748 A * | 7/1981 | Inoue | 210/222 |
| 4,784,758 A | 11/1988 | Willis | |
| 5,183,638 A | 2/1993 | Wakatake | |
| 5,244,580 A | 9/1993 | Li | |
| 5,565,105 A | 10/1996 | Thakor | |
| 5,954,933 A | 9/1999 | Ingalls | |
| 6,150,182 A | 11/2000 | Cassaday | |
| 6,273,265 B1 | 8/2001 | Greenwalt | |
| 6,464,863 B1 | 10/2002 | Nguyen | |
| 6,517,813 B1 | 2/2003 | Weitschies | |

(Continued)

FOREIGN PATENT DOCUMENTS

EP   659932   6/1995

(Continued)

OTHER PUBLICATIONS

U.S. Appl. No. 11/060,001, filed Feb. 17, 2005, Karsten Keller et al.

(Continued)

*Primary Examiner* — David A Reifsnyder (57) ABSTRACT

This invention relates to various apparatus for carrying out cake-filtration solid-liquid separation processes in which the solid-liquid mixture is subjected to a homogeneous magnetic field, a magnetic field gradient or both and cake-filtration.

11 Claims, 6 Drawing Sheets

U.S. PATENT DOCUMENTS

| | | |
|---|---|---|
| 7,070,684 B1 | 7/2006 | Fuhr et al. |
| 2003/0146174 A1 | 8/2003 | Hansen |
| 2005/0252864 A1 | 11/2005 | Keller |
| 2005/0261479 A1 | 11/2005 | Hoffmann |
| 2006/0180538 A1 | 8/2006 | Fuchs |
| 2006/0281194 A1 | 12/2006 | Fuchs |

FOREIGN PATENT DOCUMENTS

| | | |
|---|---|---|
| FR | 2128128 | 10/1972 |
| GB | 1490598 | 11/1977 |
| GB | 2153707 | 8/1985 |
| JP | 53-109272 | 9/1978 |
| JP | 58-088043 | 5/1983 |
| JP | 61-106519 | 5/1986 |
| JP | 62-079861 | 4/1987 |
| JP | 09-276624 | 10/1997 |
| JP | 2000-312838 | 11/2000 |
| JP | 2003-144973 | 5/2003 |

OTHER PUBLICATIONS

U.S. Appl. No. 11/060,004, filed Feb. 17, 2005, Benjamin Fuchs et al.

International Search Report and Written Opinion in International Applic. No. PCT/US2005/005043 dated Sep. 9, 2009 (European Patent Office, NL-2280 HV Rijswijk).

International Search Report and Written Opinion in International Applic. No. PCT/US2005/005045 dated May 24, 2005 (European Patent Office, NL-2280 HV Rijswijk).

International Search Report and Written Opinion in International Applic. No. PCT/US2006/005774 dated Jun. 28, 2006 (European Patent Office, NL-2280 HV Rijswijk).

International Search Report and Written Opinion in International Applic. No. PCT/US2006/005773 dated Jun. 28, 2006 (European Patent Office, NL-2280 HV Rijswijk).

* cited by examiner

FIG. 1

Prior Art

APPARATUS FOR MAGNETIC FIELD AND MAGNETIC GRADIENT ENHANCED FILTRATION

This application claims the benefit of U.S. Provisional Application No. 60/653,702, filed Feb. 17, 2005, which is incorporated in its entirety as a part hereof for all purposes.

TECHNICAL FIELD

This invention relates to magnetic field and magnetic field gradient enhanced filtration apparatus.

BACKGROUND

The use of solid-liquid separations is wide-spread and ranges from the large volume separations of minerals from solid-liquid mixtures to the small batch separations of high value products in the biotechnology or pharmaceutical industries. Gravitation, pressure, temperature, centrifugation, and fluid dynamics have been the dominant aspects of conventional solid-liquid separation for the past 50 years. Conventional solid-liquid separation typically consists of two primary steps. In the first step, the solid particulate is separated from the liquid by the application of pressure. The pressure may be applied by means for mechanically applying pressure, which may include a piston, gas pressure, hydrodynamic pressure, gravitational pressure, centrifugal pressure or a combination thereof wherein the liquid passes through a filter and the solid is retained by the filter. One problem encountered is solid loss as a result of solid "breaking through", i.e. passing through, the filter. An even more serious problem is that the mechanical separation step does not result in a complete separation. This necessitates the second step, a thermal drying process.

The thermal drying process is very much less energy efficient, a factor of over 100-200 times less energy efficient, than the mechanical step. Since enormous volumes of materials are processed each year, more efficient mechanical solid-liquid separations will result in dramatic reductions in overall energy consumption by reducing downstream drying requirements. This would impact energy consumption since thermal drying accounts for a significant portion of total worldwide energy consumption.

Other solid-liquid separations involve the purification of the liquid, e.g. water, from solids.

In some instances, high-gradient magnetic field separation has been used to separate particular magnetic solids from a mixture of solids in a liquid.

An object of the present invention is to provide a filtration apparatus that can provide more efficient and faster solid-liquid separation.

SUMMARY

One embodiment of this invention provides an apparatus for the cake-filtration solid-liquid separation of a solid-liquid mixture containing magnetic particles, comprising (a) means for subjecting the solid-liquid mixture to pressure, and (b) means for subjecting the solid-liquid mixture to a homogeneous magnetic field, a magnetic field gradient or both in a portion or all of the region of the apparatus in which cake-filtration occurs. Preferably, the solid-liquid mixture is subjected to a homogeneous magnetic field, a magnetic field gradient or both in the entire region of the apparatus in which cake-filtration occurs. The means for subjecting the solid-liquid mixture to a homogeneous magnetic field, a magnetic field gradient or both may include a solenoid or a permanent magnet internal or external to the region of the apparatus in which cake-filtration occurs.

Homogeneous magnetic fields with field strengths $\geq 0.01$ T have been found to be useful in this apparatus. Magnetic field gradients $\geq 1$ T/m have been found to be useful in this apparatus.

Other embodiments of this invention include an apparatus for the cross-flow filtration solid-liquid separation, or the candle filtration solid-liquid separation, of a solid-liquid mixture containing magnetic particles wherein each apparatus includes means for providing magnetic field gradients in the region of the apparatus in which filtration occurs. The magnetic field gradients are preferably $\geq 100$ T/m. Most preferred are high magnetic field gradients, i.e. gradients $\geq 5000$ T/m. The means for providing magnetic field gradients may include one or more magnetic wires or rods located in the region of the apparatus in which filtration occurs.

The apparatus of this invention is adaptable for use where the solid-liquid mixture contains ferromagnetic, paramagnetic or diamagnetic solids or when the solid-liquid mixture is seeded with ferromagnetic or paramagnetic particles. The apparatus is also adaptable for use where magnetic particles are attached to the solids to be separated, i.e. when "functionalized magnetic beads" are used.

DETAILED DESCRIPTION

A conventional cake-filtration process uses pressure to separate a solid-liquid mixture. Means for subjecting the solid-liquid mixture is provided to drive the process, and such means may be mechanical means and may include, for example, mechanical pressure, gas pressure, hydrostatic pressure, hydrodynamic pressure, gravitational pressure, or a combination thereof.

Figure 1:
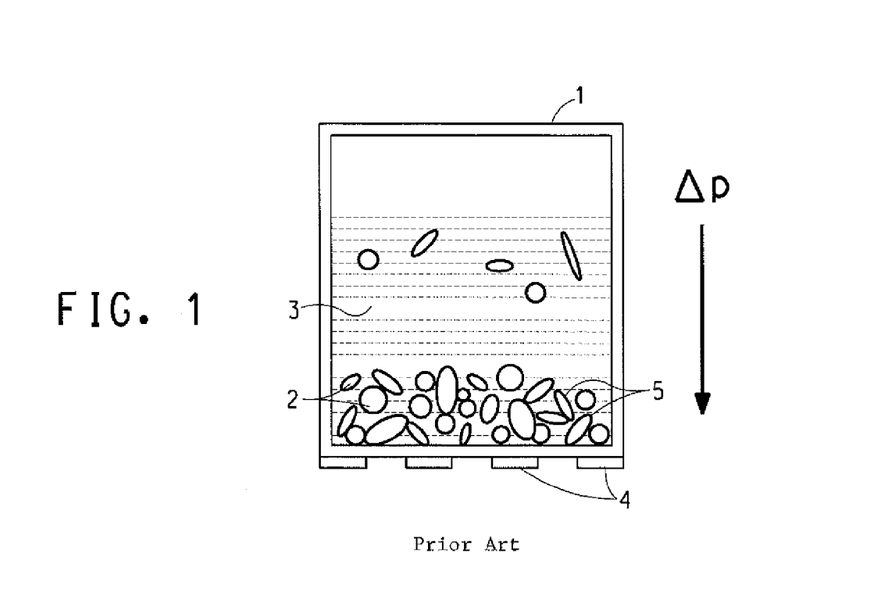
FIG. 1 illustrates conventional cake-filtration.

When the solid-liquid mixture is subjected to a pressure, the solid particulates are held back by the filter media, which results in the building-up of a filter-cake as illustrated in FIG. 1. FIG. 1 shows a container 1 containing a solid 2-liquid 3 mixture and a filter media 4. A pressure is applied to the solid-liquid mixture so that the pressure at the top of the mixture exceeds the pressure at the filter media by an amount Δp. The filtration effect is not only due to the filter media, but it is also due to the particles that build bridges 5 on top of the pores of the filter media. If a product-specific volume concentration of solids is not exceeded, the bridge building cannot take place, and the particles flow through the filter media and end up in the filtrate. Loss of product through the filter media is especially deleterious for high value products, e.g. biological products, and therefore must be avoided.

Once the particle bridges have been established, the height of the filter-cake at the filter media begins to grow. As the filter-cake height increases, the filter-cake resistance correspondingly increases. This means that the flow resistance for the liquid phase through the porous system is also increasing with filtration time.

Simple models have been developed that theoretically describe the mechanism for cake building. The models that have been developed are derived from the Darcy equation for the one phase flow through a porous system. The classical cake building expression is given by the linear equation:

$$\frac{t}{V_L} = \frac{\eta_L \cdot r_c \cdot \kappa}{2 \cdot \Delta p \cdot A^2} \cdot V_L + \frac{\eta_L \cdot R_m}{\Delta p \cdot A} \qquad \text{Eq. (1)}$$

where,
t: filtration time
$V_L$: filtrate volume
$\eta_L$: viscosity of the liquid phase
$r_c$: specific cake resistance
$\kappa$: concentration parameter
$\Delta p$: pressure difference
A: filter area
$R_m$: the filter media resistance.

To simplify the expression in Eq. (1), two variables (a) and (b) are defined such that:

$$a = \frac{\eta_L \cdot r_c \cdot \kappa}{2 \cdot \Delta p \cdot A^2} \qquad \text{Eq. (2)}$$

and $$b = \frac{\eta_L \cdot R_m}{\Delta p \cdot A}. \qquad \text{Eq. (3)}$$

Substitution of Eq.'s (2) and (3) into Eq. (1) results in the simplified linear equation given by:

$$\frac{t}{V_L} = a \cdot V_L + b \qquad \text{Eq. (4)}$$

In Eq. (4), the slope (a) is directly proportional to the specific cake resistance, and the y-axis intercept (b) is directly proportional to the filter media resistance. From Eq. (4), a simple cake-filtration experiment can be designed, and the results provide the $t/V_L$ versus $V_L$ diagram. A decrease of the slope is directly related to faster cake building kinetics.

Often at the beginning of a cake-filtration process, the filtrate is not clear since a significant portion of the solid particles pass through the filter media. In most industrial mineral separation processes, this is tolerated because the value, i.e. the cost per unit mass, of the mineral material is relatively low. The economics of the situation is drastically different when processing high value materials, however, where loss of material in the filtrate is unacceptable. For example, for the processing of "functionalized magnetic beads" that are attached to targeted biological materials such as proteins, DNA plasmids or cells, any loss of material would be economically significant since some of such materials are valued at upwards of $100,000 per kg. "Functionalized magnetic beads" are magnetic particles that are "functionalized" by treating their surfaces with a biological or chemical entity known to bind to the targeted biological material. Application of a uniform magnetic field results in a reduced loss of material to the filtrate. It is believed that this is mainly due to the effects of agglomeration.

This invention provides an apparatus for cake-filtration solid-liquid separation. The apparatus subjects the solid-liquid mixture to a homogeneous magnetic field, a magnetic field gradient or both in at least a portion of the region of the apparatus in which cake-filtration occurs. Preferably, when economically feasible, the solid-liquid mixture is subjected to a homogeneous magnetic field, a magnetic field gradient or both in the entire region of the apparatus in which cake-filtration occurs. When the solid-liquid mixture is subjected to a homogeneous magnetic field, a magnetic field gradient or both in only a portion of the region of the apparatus in which cake-filtration occurs, it is preferable that the portion be in proximity to the solid-liquid feed inlet. In one embodiment, for example, an oscillating magnetic field is used in conjunction with cake filtration.

In addition to a conventional cake-filtration configuration, the apparatus for solid-liquid separation can take the form of a drum filter, a disk filter, a belt filter, a candle filter, a cross-flow filter or any other type apparatus that relies on cake-filtration for separation.

The improved performance that results from the application of a homogeneous magnetic field to a solid-liquid mixture containing magnetic particles is due to structural changes within the mixture and/or within the porous structure of the filter-cake. A homogeneous, i.e. uniform, magnetic field provides a torque that can align or anti-align magnetic particles. Thus, the applied homogeneous magnetic field changes the structure of the solid-liquid mixture and of the filter cake, i.e. the filter plus the solid retained by the filter. The solid particles agglomerate in the presence of the magnetic field. When the particles agglomerate, they increase their effective diameter. The time it takes for solid particulates to settle in a liquid medium is proportional to the reciprocal of the square of the diameter of the particulate. Therefore the agglomeration of particles results in a decrease in the time for solid-liquid separation. The homogeneous field can be applied at any angle with respect to the direction of the pressure driving the cake-filtration process. It can be parallel to, anti-parallel to, perpendicular to or at some other angle to the direction of the pressure, whatever proves most effective for the particular solid-liquid mixture.

To agglomerate the solid particles, it is also advantageous to subject the solid-liquid mixture to a homogeneous magnetic field prior to subjecting the solid-liquid mixture to the pressure used for mechanical separation. Following this agglomeration step, the solid-liquid mixture can also be subjected to an additional homogeneous magnetic field, a magnetic field gradient or both in conjunction with the cake-filtration process.

With a magnetic field gradient there is a magnetic force on the magnetic particles, i.e. the ferromagnetic, paramagnetic or diamagnetic particles, present in the solid-liquid mixture. The magnetic force can significantly influence the particle movement during cake-filtration. The magnetic field gradient can also contribute to agglomeration with the advantages previously discussed.

The magnetic force provided by the magnetic field gradient can affect the separation in various ways depending upon the orientation of the magnetic force. The magnetic force can be oriented in the same direction as the force provided by the mechanical pressure. For example, when the means for providing pressure is the gravitational force and it is being used in a settling process, a magnetic force in the same direction as the gravitational force accelerates the settling process of the magnetic solid particles.

Alternatively, the magnetic force can be oriented in the opposite direction to the force provided by the mechanical pressure. In another embodiment, when the mechanical means is gas pressure and it is being used in a cake-filtration process, a magnetic force in the direction opposite to the force provided by the gas pressure results in a decrease in the filter cake resistance so that the liquid more readily passes through the filter cake. As a result, separation is accelerated.

The use of a homogeneous magnetic field, a magnetic field gradient or both in conjunction with mechanical pressure improves both the static and kinetic aspects of the solid-liquid separation. Some of the advantages of this invention are:

1) A reduction of solid breakthrough, which occurs particularly in the beginning of a filtration process in the absence of a homogeneous magnetic field or a magnetic field gradient. The reduction of solid breakthrough results in a significant reduction in solid loss. This is especially important for separations of high value products in the chemical, biotechnology or pharmaceutical industries.
2) A faster process for separating the solid-liquid mixture. The benefits are shorter residence times, a reduction in the necessary separation area and/or higher throughput.
3) A reduction in the residual liquid content of the filter and the solid retained by the filter. This is very important since it significantly reduces the operation costs of the thermal drying step. It also results in better handling properties for conveyance to down-stream treatments.
4) A reduction of the time to reach gas breakthrough. Gas breakthrough occurs when the cake-filtration separation process has proceeded to the stage that the gas providing the pressure to drive the cake-filtration process passes through the filter. This shows that subjecting it to a magnetic field can change the particle interaction of fine and very weak magnetic material. This effect can be exploited in other separation processes.

The agglomeration of the particles plays an important role in the improvement of the separation. Although this agglomeration also reduces the need for the addition of flocculants, e.g. long-chain polymers, to improve process performance and thereby results in a smaller amount of chemicals needed to process the product, the solid-liquid mixture can include flocculents, surfactants and sols when needed. The solid-liquid mixture typically has many of the same characteristics as a suspension.

The magnetic particles in the solid-liquid mixture can be ferromagnetic, ferrimagnetic, anti-ferromagnetic, paramagnetic or diamagnetic. The solid-liquid mixture can also be seeded with ferromagnetic or paramagnetic particles to promote separation. The improved process is also effective when "functionalized magnetic beads" are used, i.e. when magnetic particles are attached to targeted solids to be separated. Costly bio-materials can be attached to such magnetic particles in order to facilitate the separation process and reduce the loss of the costly bio-material. "Magnetic particles" as used herein includes all of the magnetic materials mentioned in this paragraph.

For solids having weaker magnetic properties, superconductor magnets can provide high magnetic field strengths useful in enhancing the separation.

This invention also provides an apparatus for the cross-flow filtration solid-liquid separation of a solid-liquid mixture containing magnetic particles. The apparatus comprises means for providing magnetic field gradients in the region of the apparatus in which filtration occurs. These may be localized gradients in the sense that they are operative within the apparatus in which separation is occurring. In a cross-flow filter, the solid-liquid mixture is fed into and flows through this filtration region that is enclosed by a filter material, with provisions for an inlet for feeding in the solid-liquid mixture and an outlet for exiting liquid that has not passed through the filter material. A typical configuration is a tube in which the walls of the tube are formed from a filter membrane. The solid-liquid mixture is fed into one end of the tube, and, as it flows down the tube, the liquid passes through the membrane and is collected as filtrate. The solids are retained within the tube, and the concentrated solid-liquid mixture is ejected at the other end of the tube. This type of filter is typically used to purify a liquid such as water, i.e. to separate solid contaminant from the liquid. It is important to keep the solid particles away from the filter material to avoid clogging and fouling, i.e. to avoid forming a cake that impedes the filtration.

The apparatus of this invention achieves this by providing means for providing magnetic field gradients in the region of the apparatus in which filtration occurs. The magnetic field gradients are preferably $\geq 100$ T/m. Most preferred are high magnetic field gradients, i.e. gradients $\geq 5000$ T/m. The means for providing magnetic field gradients may include any material that will provide magnetic field gradients such as localized gradients, which will provide forces that attract the magnetic particles toward the center of the tube. Typically, the means for providing magnetic field gradients includes a material that provides magnetic field gradients when placed in a magnetic field, e.g. steel wire or steel rods. One or more wires or rods can be used. The magnetic wires or rods are placed in the central region of the tube so that the magnetic forces resulting from the magnetic field gradients in the vicinity of the wires or rods attract the solid magnetic particles to the magnetic wires or rods. The particles adhere to the wires or rods in the center of the tube and are kept away from the filter membrane. The apparatus is further comprised of means to provide a magnetic field. The means to provide a magnetic field may include a solenoid or a permanent magnet.

Figure 6:
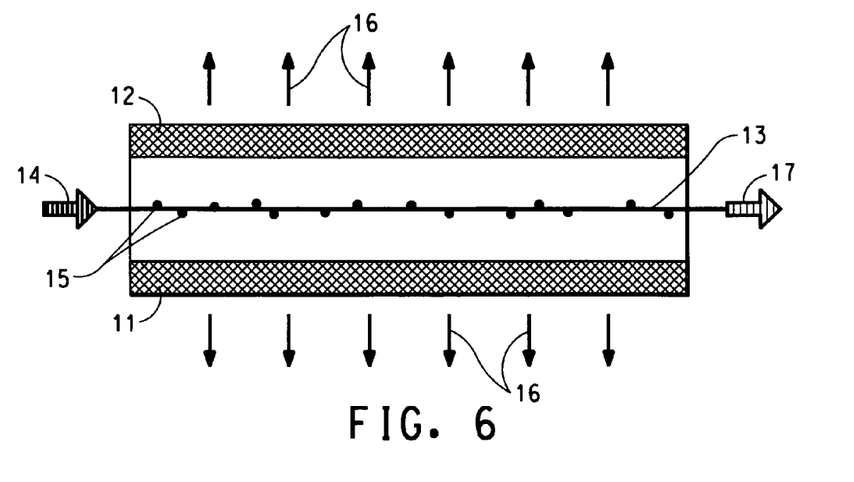
FIG. 6 is a schematic drawing of a cross-section of a cross-flow filtration apparatus of the invention and its filtration operation.

A schematic drawing of a cross-section of a cross-flow filtration apparatus of the invention is shown in FIG. 6. A cross-flow filtration apparatus 11 is shown with a tube of filter membrane 12 and a single magnetic wire 13 in proximity to, or along, the axis of the tube. The solid-liquid mixture is fed into one end of the tube as indicated by arrow 14. The magnetic particles 15 are attracted to and adhere to the magnetic wire as a result of the magnetic force. The liquid passes through the filter membrane along the length of the tube as indicated by arrows 16, and is collected as the filtrate. Liquid that has not passed through the filter and may still contain some solid particles exits the other end of the tube as indicated by arrow 17, and can be cycled through another tube filtration apparatus or discarded. Periodically the magnetic wire is removed from the tube and the magnetic particles are cleaned from the wire. The wire can then be replaced in the tube. The applied magnetic field is preferably perpendicular to the axis of the tube.

Figure 7A:
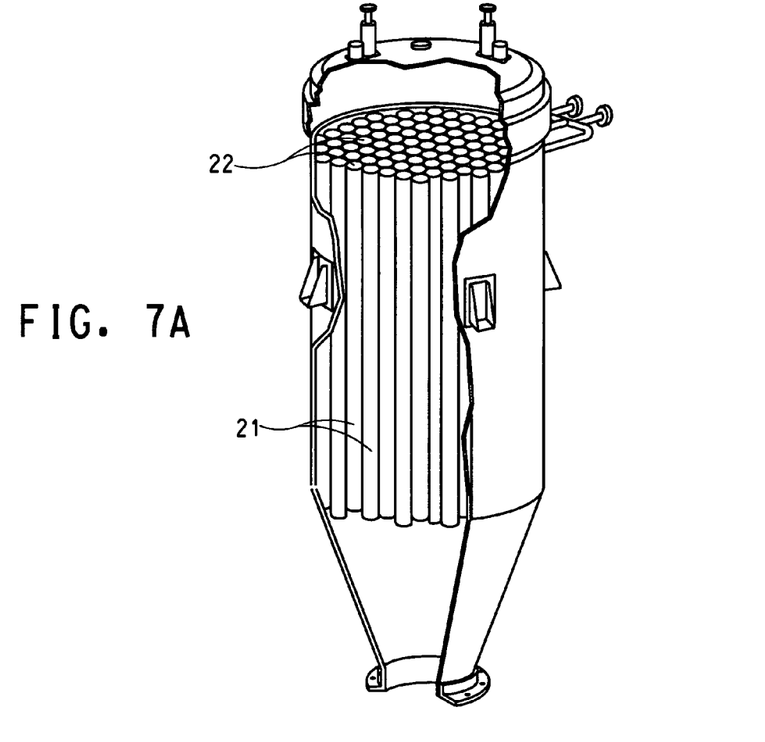
FIG. 7 is a drawing of a candle filter and schematic drawing of a cross-section of one tube from a candle filter with and without the means for providing magnetic field gradients and the differences in its filtration operation.

This invention also provides an apparatus for the candle filtration solid-liquid separation of a solid-liquid mixture containing magnetic particles. The apparatus comprises means for providing magnetic field gradients, such as localized gradients, in the region of the apparatus in which filtration occurs. A candle filter is comprised of a plurality of tubes that resemble long, slender candles with the top end of the tube open and the bottom end of the tube closed. The tube is constructed of a filter material, e.g. a filter membrane. A drawing of a candle filter is shown in FIG. 7a. The plurality of tubes 21 is arranged so that they can be fed simultaneously with the solid-liquid mixture feed at the open tops 22 of the tubes.

Figure 7B:
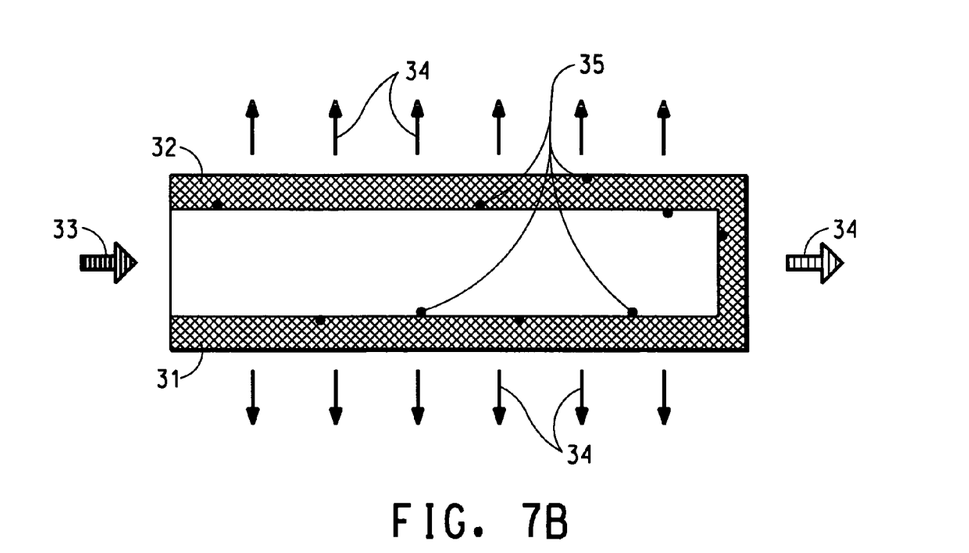

FIG. 7b shows a cross-section of a single tube 31 with a filter membrane 32 forming the tube. The solid-liquid mixture is fed into the open top end of the tube as indicated by arrow 33. As it flows down the tube, the liquid passes through the membrane and is collected as filtrate as indicated by arrows 34. The solid particles 35 are retained within the tube and collect on the sides of the tube, thereby clogging and fouling the filter membrane. This slows the filtration process and requires the process to be stopped and the tubes to be cleaned.

The apparatus of this invention solves this problem by providing means for providing magnetic field gradients. The magnetic field gradients are preferably $\geq 100$ T/m. Most preferred are high magnetic field gradients, i.e. gradients $\geq 5000$ T/m. As in the cross-flow filtration apparatus of the invention, the means for providing magnetic field gradients may include any material that will provide magnetic field gradients such as localized magnetic field gradients, which result in forces that attract the magnetic particles toward the center of the tube. Typically, the means for providing magnetic field gradients includes a material that provides localized magnetic field gradients when placed in a magnetic field, e.g. steel wire or steel rods. One or more wires or rods can be used in each tube. The magnetic wires or rods are placed in the central region of the tube, i.e. in proximity to or along the axis of the tube. The magnetic forces resulting from the magnetic field gradients in the vicinity of the wires or rods attract the solid magnetic particles to the magnetic wires or rods. The particles adhere to the wires or rods in the center of the tube and are kept away from the filter membrane. The apparatus is further comprised of means for providing a magnetic field. The means for providing a magnetic field may include a solenoid or a permanent magnet.

Figure 7C:
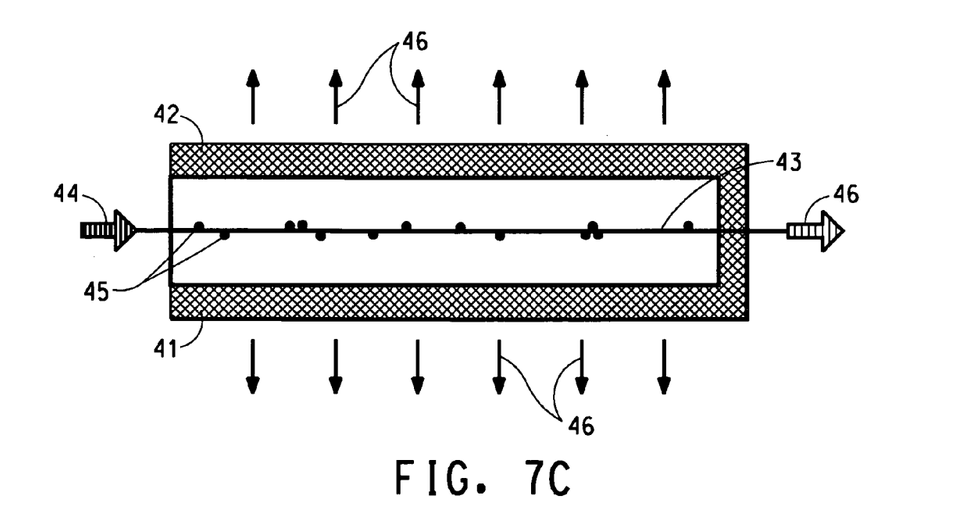

A schematic drawing of a cross-section of a single tube of a candle filtration apparatus of the invention is shown in FIG. 7c. The single tube 41 is shown with a filter membrane 42 forming the tube and a single magnetic rod 43 disposed along the axis of the tube. The solid-liquid mixture is fed into the top open end of the tube as indicated by arrow 44. The magnetic particles 45 are attracted to and adhere to the magnetic rod as a result of the magnetic force. The liquid passes through the filter membrane along the length of the tube as indicated by arrows 46, and is collected as the filtrate. Periodically the magnetic rod is removed from the tube, and the magnetic particles are cleaned from the magnetic rod. The magnetic rod can then be replaced in the tube. The applied magnetic field is preferably perpendicular to the axes of the tubes. In one embodiment, the magnetic rods are connected at the top to form an assembly so that they can all be removed and replaced simultaneously.

Four different materials of varying degrees of magnetic susceptibility ($\chi_m$) were used in most of the Examples of the invention. The four materials are: 1) titanium dioxide, $TiO_2$, obtained from E. I. du Pont de Nemours and Company, Wilmington, Del., 2) hematite, $Fe_2O_3$ 601, obtained from Atlantic Equipment Engineers, Bergenfield, N.J., 3) natural hematite, $Fe_2O_3$ F&S, obtained from Frank & Schulte GMBH, Essen, Germany and 4) magnetite, $Fe_3O_4$, obtained from Höganäs AB, Höganäs, Sweden. Pertinent physical properties of these materials, i.e., density, particle size, and magnetic susceptibility, are given in Table I.

TABLE I

| Material | $TiO_2$ | $Fe_2O_3$ (601) | $Fe_2O_3$ (F&S) | $Fe_3O_4$ |
|---|---|---|---|---|
| Density $\rho$ g/cm$^3$ | 4.3 | 4.8-5.2 | 4.9 | 5 |
| Median particle size μm | 1.04 | 0.6 | 4.72 | 1.27 |
| Magnetic susceptibility $\chi_m$(cgs) | $<3 \times 10^{-7}$ | $\approx 10^{-4}$ | para-ferro $\approx 1$ | ferro. |

All experiments were performed with de-ionized water as the liquid phase. All experiments were performed using air pressure to drive the cake-filtration process.

The apparatus used in the Examples consisted of a modified CUNO filter rigidly mounted at the center of a non-magnetic plastic frame. The plastic frame supporting the CUNO filter was then rigidly mounted within the internal bore of a high temperature superconducting (HTS) solenoidal magnet. The CUNO filter could then be placed at various locations along the magnet's central axis. Thus, if the CUNO filter were placed at the axial center of the magnet, the filter and its corresponding product would experience a homogeneous B-field. Likewise, if the CUNO filter were placed at the far ends of the axis of the magnet, the filter and its product would experience a magnetic field gradient. The HTS magnet consisted a warm bore inner diameter of 20 cm, a height of 30 cm, with a maximum central magnetic field of 3.0 T. Computer modelling was used to calculate the magnetic field distribution of the HTS solenoid coil and hence determine parameters such as the degree of B-field homogeneity or strength of the B-field gradient.

The filter unit that was used for the solid-liquid filtration experiments was purchased from CUNO Inc., Meriden, Conn. The CUNO filter was modified to decrease its height for the experiments of the Examples. The filter specifications are listed in Table II.

TABLE II

| Model | Tri-47 |
|---|---|
| Filtration Area | 13.1 cm$^2$ |
| Filter height | 8.62 cm |
| Max. pressure | 60 psi |
| Reservoir volume | 150 ml |
| Filter Mesh Type/Size | Nylon/1 μm |

EXAMPLES OF THE INVENTION

Example 1

The purpose of this Example is to study the fundamentals of the cake building process in the presence of a homogeneous magnetic field, B-field, applied perpendicular to the direction of the air pressure. Experiments were performed using ferromagnetic magnetite, $Fe_3O_4$, as the solid in the solid-liquid mixture. The concentration of the magnetite was 11 volume percent. Separate runs were carried out with homogeneous magnetic strengths of 0 T, 0.03 T, 0.05 T, 0.1 T and 0.5 T. The air pressure used in each run was 1.6 bar. Even a relatively small homogeneous B-field significantly altered the filter-cake structure. At applied B-fields of 0.03 T or more, a filter-cake build-up could not be observed as a result of the destruction of the cake structure itself. This made it impossible to study the fundamentals of the cake building process in the presence of a B-field using $Fe_3O_4$. However, the dramatic change in filter-cake structure for $Fe_3O_4$ can be exploited to improve the separation process when $Fe_3O_4$ is present in the solid-liquid mixture.

Example 2

The purpose of this Example is to demonstrate the reduction in material lost to the filtrate when a homogeneous magnetic field is applied during a cake-filtration.

A mixture of ferromagnetic magnetite, $Fe_3O_4$, and water was prepared. The concentration of the magnetite was 11 volume percent. The mixture was divided into 8 equal portions, each of 15 g, so that 8 separate runs could be carried out. Each portion in turn was placed in the cake-filtration apparatus with the CUNO filter. The air pressure used in each of the eight runs was 1.6 bar. The first four separate experimental runs were carried out with no applied magnetic field. The mass of the solid in the filtrate was determined gravimetrically. The average of the solid mass in the filtrate of these four runs was 0.135 g. The second four separate experimental runs were carried out in a homogeneous magnetic field of 0.03 T. The direction of the homogeneous magnetic field was perpendicular to the direction of the pressure. The average of the solid mass in the filtrate of these four runs was 0.025 g. This shows an 80% reduction in the solid filtrate mass, i.e., the solid breakthrough. The application of an external B-field resulted in a reduced loss of material to the filtrate. It is believed that the reduction is primarily due to agglomeration of the particles, i.e., to agglomerates, which are now too large to pass through the filter media. The $Fe_3O_4$ material used for these experiments is in the same particle size range as many of the mentioned commercial "magnetic beads" now gaining popularity for use as "functionalized magnetic beads" in high value bio-separations. This Example demonstrates that the application of a homogeneous magnetic field during a cake-filtration improves the efficiency and economics of such bio-separations.

Example 3

The purpose of this Example is to demonstrate the reduction in the residual moisture of the filter-cake when cake-filtration is carried out in the presence of a homogeneous magnetic field.

Figure 2:
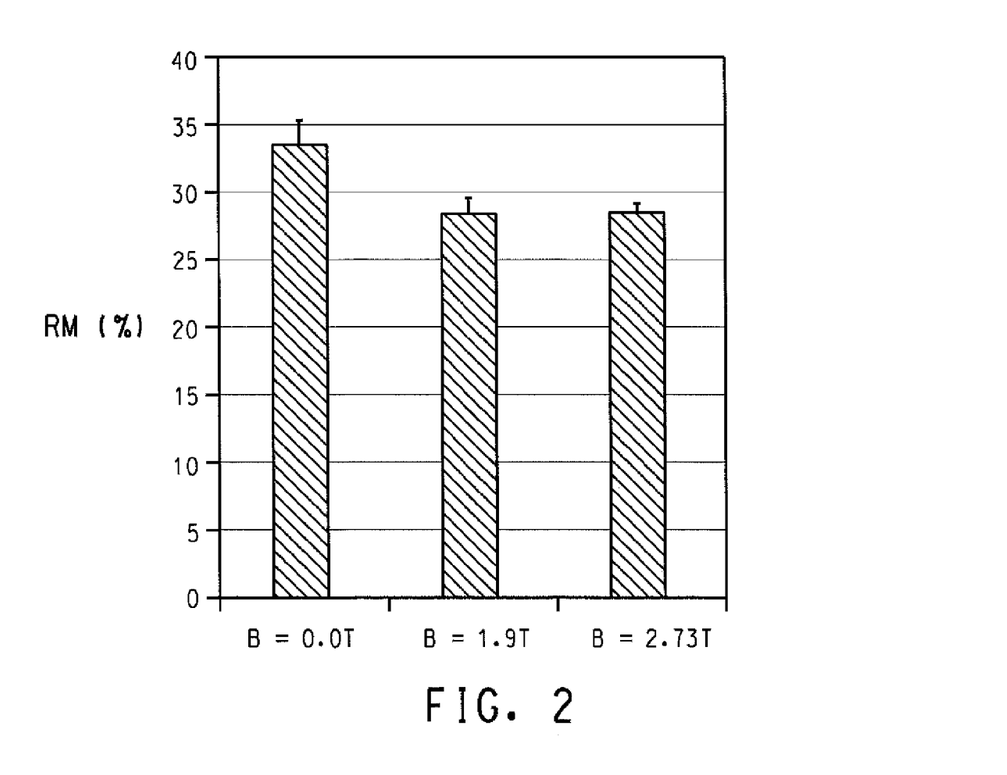
FIG. 2 shows the reduction in the residual moisture of a filter-cake when cake-filtration process is carried out in the presence of a homogeneous magnetic field.

The residual moisture (RM) is used to quantify the amount of liquid that remains trapped inside the filter-cake after the de-watering equilibrium is achieved, i.e., when no more liquid passes through the filter even though the pressure contains to be applied. The lower the RM, the more effective the mechanical treatment. The more effective the mechanical treatment the lower energy will be consumed in the overall solid-liquid separation process. RM is experimentally determined by measuring the mass of liquid trapped relative to the mass of the wet filter-cake. These masses were determined by gravimetric measurements before and after drying the filter cake in an oven. A mixture of water and paramagnetic $Fe_2O_3$ (601) containing 6.16 volume percent $Fe_2O_3$ was prepared and divided into nine portions. Each portion in turn was placed in the cake-filtration apparatus with the CUNO filter. The gas pressure used in each of the runs was run was 2.8 bar. Three cake-filtration processes were carried out with no external magnetic field, three cake-filtration processes with a homogeneous magnetic field of 1.9 T and three cake-filtration processes with a homogeneous magnetic field of 2.73 T. The direction of the homogeneous magnetic field was perpendicular to the direction of the pressure. FIG. 2 shows a plot of the mean residual moisture content for the three conditions of the applied external B-field. The mean RM value and error bars in FIG. 2 are the calculated average and $\sigma_s$ of three separate experimental runs at each of the magnetic field conditions, respectively. Results indicate that the relative reduction in RM is nearly 17% for an applied homogeneous B-filed of 1.9 T and that further increases in the applied homogeneous B-field do not further decrease the RM. Reductions in RM content during the mechanical separation step can have an enormous impact on decreasing the energy consumption during the thermal drying step, hence increasing the energy efficiency, of the solid-liquid separation.

Example 4

The purpose of this Example is to demonstrate the increase in the rate of cake building in the presence of a inhomogeneous magnetic field.

A mixture of water and paramagnetic $Fe_2O_3$ (F&S) containing 25 volume percent $Fe_2O_3$ was prepared and divided into 20 portions. Each portion in turn was placed in the cake-filtration apparatus with the CUNO filter. The air pressure used in each of the 20 runs was run was 0.8 bar. Four cake-filtration processes were carried out with each of the external inhomogeneous magnetic fields of 0, 0.2 T, 0.4 T, 0.6 T and 0.8 T, respectively. The direction of the inhomogeneous magnetic field gradient was parallel to the direction of the pressure such that the magnetic force on the magnetic particles was opposite in direction to the pressure gradient. The filtrate volume $V_L$ was measured as a function of the filtration time t for each of the 20 runs.

Figure 3:
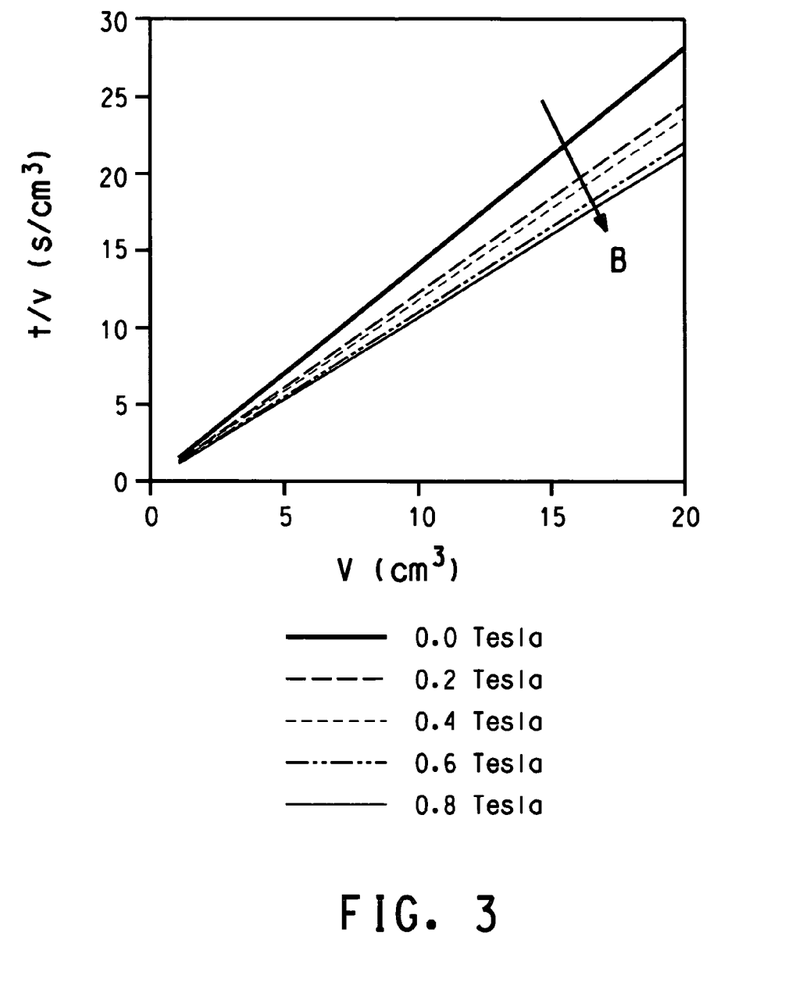
FIG. 3 is a plot of the quantity (filtration time/filtrate volume) versus filtrate volume for cake-filtration carried out in the presence of various inhomogeneous magnetic fields.

For the evaluation of the cake building kinetics the $t/V_L$ versus $V_L$ equation discussed above can be used to quantitatively analyze the results. The slope a of the $t/V_L$ versus $V_L$ line is proportional to the specific cake resistance. The mean value of $t/V_L$ for a given value of the inhomogeneous magnetic field was calculated from the four separate experimental runs carried out with that inhomogeneous magnetic field. Shown in FIG. 3 is the mean value of $t/V_L$ versus $V_L$ for the various values of the B-field. The influence of the inhomogeneous B-field on the cake building process can be seen in FIG. 3. As the B-field increases, the slope of the $t/V_L$ curve correspondingly decreases. A decreasing slope implies faster cake building kinetics. An applied B-field of 0.8 T results in a decrease in the cake resistance of about 25% compared to that with no field applied. The primary reason for this improvement is the physical structure change in the filter-cake as it builds in the presence of the external inhomogeneous B-field. This structure change has a positive effect on the liquid flow through the porous medium and the separation.

Example 5

The purpose of this Example is to demonstrate the acceleration of gas-breakthrough when cake-filtration is carried out in the presence of a homogeneous magnetic field.

A mixture of water and weakly paramagnetic $TiO_2$ containing was prepared and divided into 8 portions. Each portion in turn was placed in the cake-filtration apparatus with the CUNO filter. The air pressure used in each of the 20 runs was run was 3.3 bar. Four cake-filtration processes were carried out with no external magnetic field and with an external homogeneous magnetic field of 2.73 T, respectively. The direction of the homogeneous magnetic field was perpendicular to the direction of the pressure. The time of gas breakthrough was measured for each run.

Figure 4:
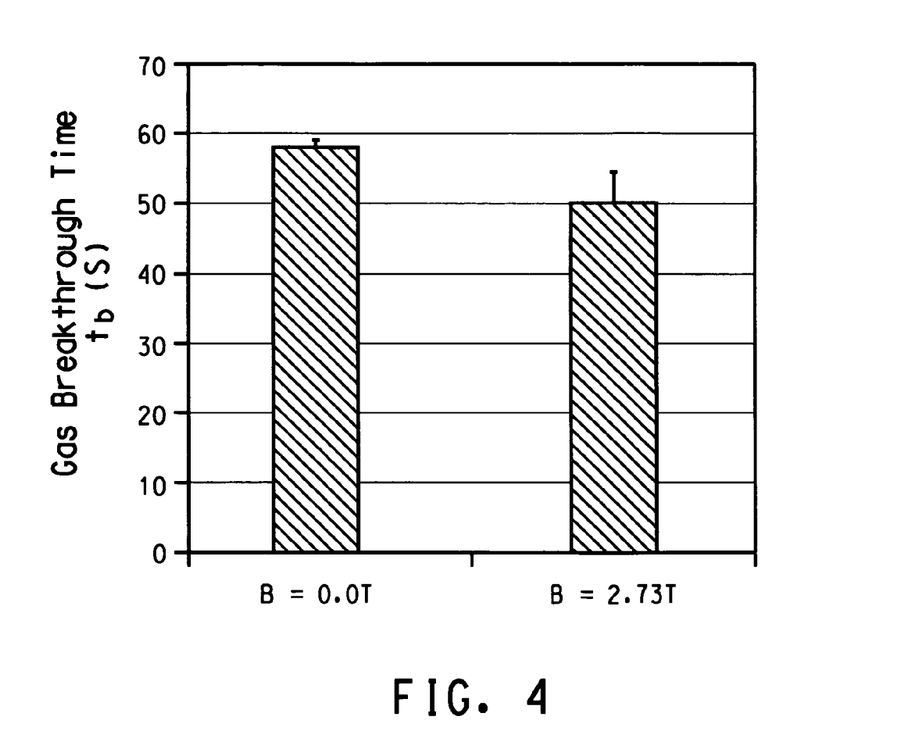
FIG. 4 shows the reduction in gas breakthrough time for cake-filtration carried out in the presence of a homogeneous magnetic field.
Figure 5:
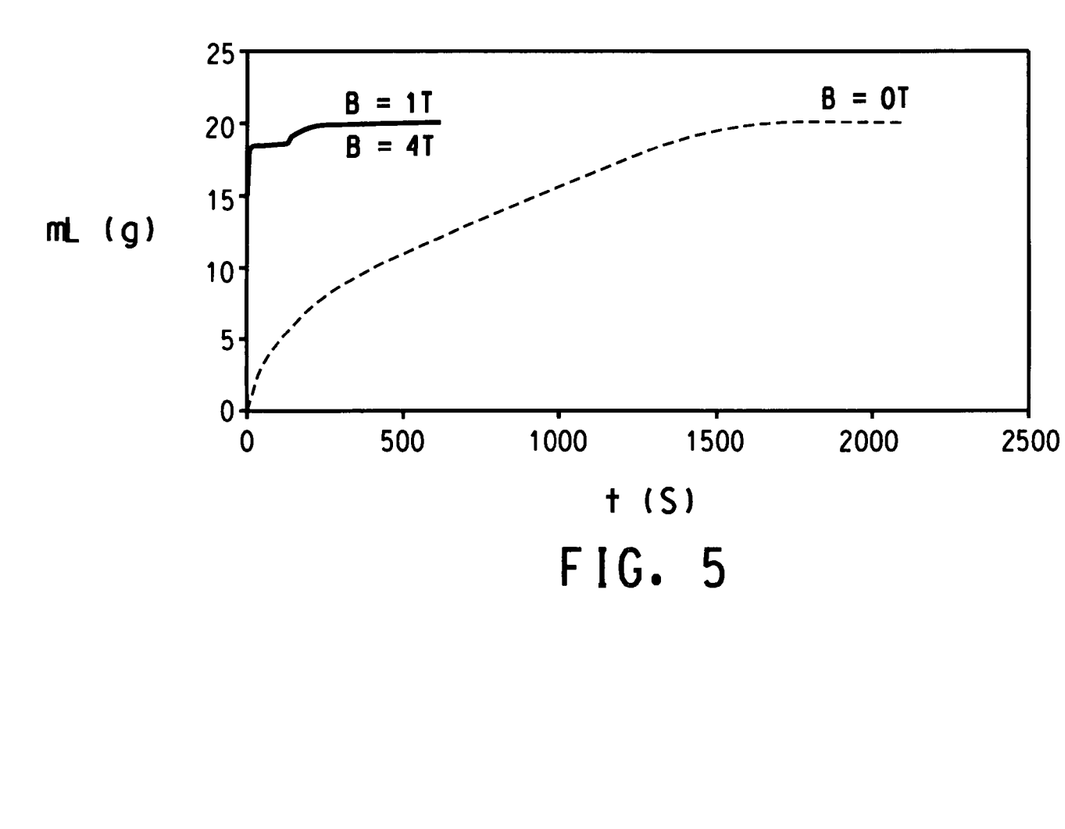
FIG. 5 is a plot of the mass of the liquid passed through the filter versus time for cake-filtration carried out in the presence of various inhomogeneous magnetic fields.

FIG. 4 shows the mean gas breakthrough time ($t_b$) for the two different applied B-field conditions, i.e., 0 and 2.73 T. The mean $t_b$ value and error bars in FIG. 4 for each field condition are the calculated average and $\sigma_s$ of four separate experimental runs, respectively. These results show that the gas breakthrough time occurs earlier for the TiO$_2$ subjected to an applied B-field and therefore indicating a faster separation process. It is believed that this effect is due to changes in the particle-particle interaction of the TiO$_2$.

Example 6

The purpose of this Example is to demonstrate the increase in the rate of cake building in the presence of an inhomogeneous magnetic field.

For this example a piston was used so that this is a press filtration process. Air pressure forced the piston downward and the piston in turn pushed the water through the filter.

A mixture of water and iron oxide inorganic pigment, Bayoxide® E8706 iron oxide inorganic pigment, obtained from Bayer AG, Leverkusen, Germany, containing 16.5 volume percent Bayoxide® E8706 was prepared and divided into 3 portions each containing 60 g of water and iron oxide Bayoxide®. Each portion in turn was placed in the cake-filtration apparatus with the CUNO filter. The air pressure used in each of the 3 runs was run was 0.8 bar. The mass of water that passed through the filter was measured as a function of time. In one run no external magnetic field was applied, i.e., B=0. In the other two runs, an inhomogeneous magnetic field was applied. The field strength in one run was 1 T and in the other run was 4 T. The magnetic field gradient and magnetic force was higher for the 4 T field. The direction of the inhomogeneous magnetic field gradient was such that the magnetic force on the magnetic particles was opposite in direction to the pressure gradient. The magnetic particles responded to the magnetic force by moving toward the piston and away from the filter-cake. The mass of water that passed through the filter was measured as a function of time. The results of the three runs are shown in FIG. 3 where the mass of the liquid that passed through the filter is shown as a function of time. The results with 1 T and 4 T are essentially identical. Applications of these fields improved the speed of the cake building by a factor of 200. These results show that the application of a magnetic field gradient during cake-filtration can make a dramatic improvement in the process kinetics.

Other separation devices, and methods for their use, suitable for use herein are described in U.S. application Ser. No. 11/060,001, and Ser. No. 11/060,004, both filed Feb. 17, 2005, each of which is incorporated in its entirety as a part hereof for all purposes.

What is claimed is:

1. An apparatus for the solid-liquid separation of a solid-liquid mixture containing magnetic particles, comprising (a) a tubular filtration region having an axis, wherein the side walls of the tubular region comprise filtration material; (b) material that provides magnetic field gradients when placed in a magnetic field wherein the material resides in proximity to the axis of the tubular filtration region along the length thereof; and (c) means to provide a magnetic field.

2. An apparatus according to claim 1 wherein the magnetic field gradients provide forces that attract magnetic particles toward the center of the filtration region and away from the filtration material.

3. An apparatus according to claim 1 wherein the material that provides magnetic field gradients resides along the axis of the tubular filtration region.

4. An apparatus according to claim 1 wherein the material that provides magnetic field gradients comprises one or more steel wires or rods.

5. An apparatus according to claim 1 wherein the means to provide a magnetic field comprises a solenoid or a permanent magnet.

6. An apparatus according to claim 1 wherein the solids in the solid-liquid mixture comprise bio-materials.

7. An apparatus according to claim 1 wherein the tubular filtration region further comprises an end wall that comprises filtration material.

8. An apparatus according to claim 1 further comprising a plurality of tubular filtration regions.

9. A cross-flow filtration system comprising an apparatus according to claim 1.

10. A candle filtration system comprising an apparatus according to claim 1.

11. An apparatus according to claim 1 wherein the material that provides magnetic field gradients resides along the full length of the tubular filtration region.

* * * * *